Figure 1:
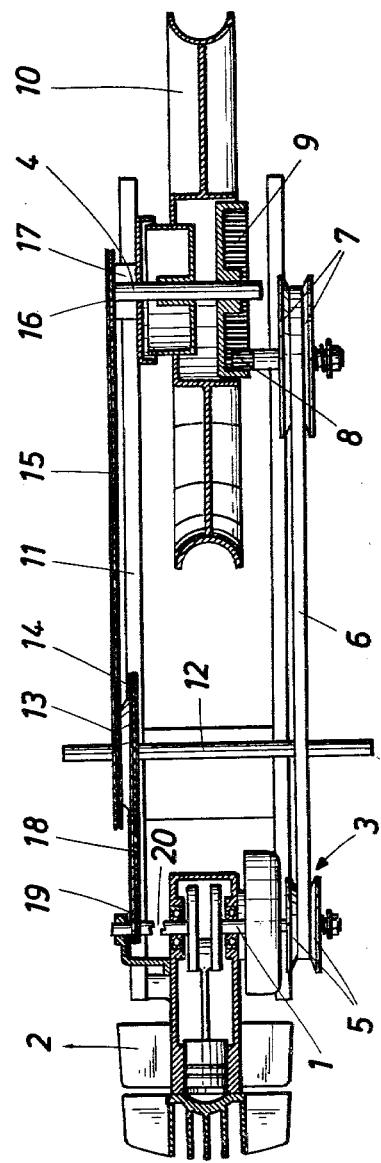

United States Patent [19]

Kostron

[11] 4,301,885
[45] Nov. 24, 1981

[54] MOTOR-ASSISTED BICYCLE

[75] Inventor: Gerhard Kostron, Wels, Austria

[73] Assignee: Bombardier-Rotex Gesellschaft m.b.H., Gunskirchen, Austria

[21] Appl. No.: 106,864

[22] Filed: Dec. 26, 1979

[30] Foreign Application Priority Data

Jan. 5, 1979 [AT] Austria .................................... 78/79

[51] Int. Cl.³ ............................................. B62K 11/00
[52] U.S. Cl. ................................ 180/205; 123/179 R; 180/207
[58] Field of Search ....................... 180/205, 206, 207; 123/179 R, 179 SE

[56] References Cited

U.S. PATENT DOCUMENTS

| 700,151 | 5/1902 | Muzzy | 180/206 |
| 2,770,311 | 11/1956 | Kreidler | 180/205 |
| 4,169,512 | 10/1979 | Ishikawa et al. | 180/205 |

FOREIGN PATENT DOCUMENTS

| 1144610 | 2/1963 | Fed. Rep. of Germany | 180/205 |
| 1167678 | 4/1964 | Fed. Rep. of Germany | 180/205 |

Primary Examiner—Joseph F. Peters, Jr.
Assistant Examiner—Donn McGiehen
Attorney, Agent, or Firm—Kurt Kelman

[57] ABSTRACT

A pedal shaft and a rear wheel shaft spaced apart from said pedal shaft are rotatably mounted in a supporting structure. An overrunning clutch is engageable to transmit torque to said rear wheel shaft from a chain drive, which is operatively connected to said pedal shaft. A motor is carried by said support and has a motor shaft, which is connected by a self-adjusting cone drive to said rear wheel shaft. An arbitrarily engageable one-way starting clutch is operatively connected on one side to said pedal shaft independently of said rear wheel shaft and on the other side is operatively connected to said motor shaft. Engagement of the overrunning clutch is controllable.

6 Claims, 5 Drawing Figures

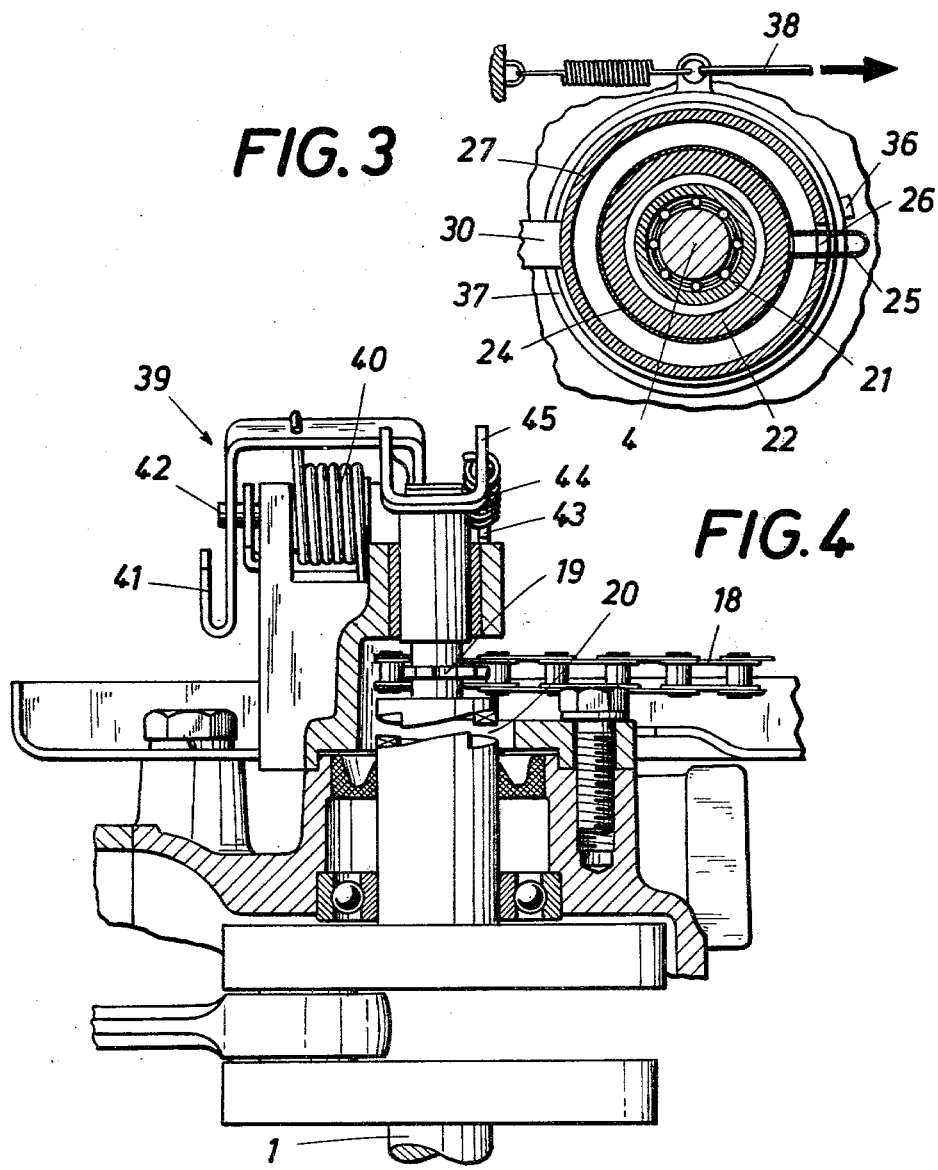

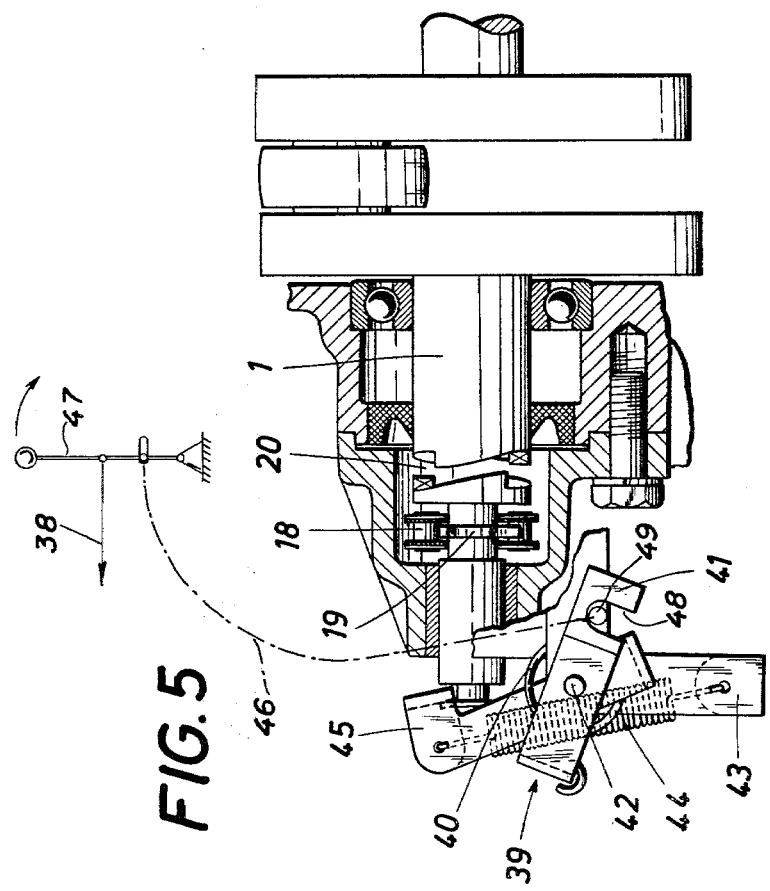

MOTOR-ASSISTED BICYCLE

This invention relates to a motor-assisted bicycle comprising a pedal shaft, which is connected to a rear wheel shaft by a chain drive and an overrunning clutch, a self-adjusting cone drive connected between the motor shaft and the rear wheel shaft, and a starting clutch for driving the motor shaft from the pedal shaft.

In motor-assisted bicycles of that kind, torque is transmitted from the pedal shaft to the motor shaft via the rear wheel shaft so that the motor can be started only when the bicycle has been jacked up or during a pedal-driven run but cannot be started from standstill when the rear wheel is resting on the ground. Another disadvantage resides in that the pedal shaft must be rotated to start the motor and in that case drives also the rear wheel shaft and the cone drive connected between the motor shaft and rear wheel shaft. When a suitable speed has been reached, the starting clutch is automatically engaged to establish the drive connection to the motor shaft. When the motor has been started, the starting clutch remains engaged; this is permitted by the overrunning clutch connected between the pedal shaft and the motor shaft. The starting of such motor-assisted bicycle is obviously rendered more difficult by the fact that the cone drive transmission must also be rotated during such starting.

It is an object of the invention to avoid these disadvantages and to provide an improved motor-assisted bicycle which can easily be started from standstill when the rear wheel is resting on the ground as well as during a pedal-driven run. Besides, the application of the back-pedaling brake by the pedal shaft is still be possible.

This object is accomplished according to the invention in that the starting clutch consists of an arbitrarily engageable one-way clutch and its input member is operatively connected to the pedal shaft independently of the rear wheel shaft, the overrunning clutch is arbitrarily engageable and disengageable, and engagement-preventing means are associated with said overrunning clutch and arbitrarily controllable to selectively permit and prevent its engagement. When these two features are combined, the engagement of the overrunning clutch can be prevented so that the drive connection between the pedal shaft and the rear wheel shaft will remain interrupted, and a direct connection between the pedal shaft and the motor shaft can be established. As a result, the motor of the motor-assisted bicycle can be started without a simultaneous rotation of the rear wheel. Because the drive connection between the motor and the rear wheel is interrupted at an interposed overrunning clutch, it is sufficient to rotate the motor shaft so that the starting of the motor is greatly facilitated. After the motor has been started, the overrunning clutch is engaged. Because said engagement-preventing means can be arbitrarily controlled, the motor of the motor-assisted bicycle can also be started during a pedal-driven run. In that case it is sufficient to leave the engagement-preventing means disabled so that the overrunning clutch can engage.

The starting clutch must consist of a one-way clutch so that the pedal shaft will not be driven by the motor shaft when the motor has been started and the motor shaft rotates at a higher speed.

Conventional overrunning clutches for motor-assisted bicycles generally comprise a first clutch member, which is non-rotatably connected to the rear wheel shaft, a screw-threaded sleeve, which is rotatably mounted on the rear wheel shaft and operatively connected to the pedal shaft by a chain drive, a screw-threaded second clutch member, which is screw-threaded on the screw-threaded sleeve and, on the side remote from the first clutch member, coupling claws for applying a back-pedaling brake, and a spring for frictionally restraining the second clutch member against rotation. By a rotation of the sleeve which is operatively connected to the pedal shaft, the second clutch member, which is mounted on the sleeve and restrained against rotation by the spring, will be axially displaced to one side or the other, depending on the direction of rotation. As a result, a drive connection between the pedal shaft and the rear wheel shaft will be established at the first clutch member fixed to the rear wheel shaft, or the back-pedaling brake will be applied via the coupling claws by the pedal shaft. Because the axial displacement of the screw-threaded clutch member is limited by its engagement with the first clutch member or the back-pedaling brake, this clutch member subsequently rotates with the screw-threaded sleeve against the frictional force of the spring and thus drives the rear wheel shaft or applies the back-pedaling brake. When the rear wheel shaft leads the screw-threaded sleeve, the rear wheel shaft will drive the screw-threaded clutch member to rotate it relative to the screw-threaded sleeve in the clutch-disengaging sense. For this reason the pedal shaft can be operated to provide an overrunning position, an application of the pedaling brake and a driving of the rear shaft.

According to a preferred feature of the invention, such an otherwise conventional overrunning clutch is provided with a stop, which limits the axial movement of the screw-threaded clutch member in the clutch-engaging direction and which is adjustable by a control element. This stop will provide effective means for preventing an engagement of the overrunning clutch so that the motor can be started while the rear wheel is at a standstill. When the stop has been adjusted to limit the axial displacement of the screw-threaded clutch member so that the overrunning clutch cannot be engaged, the screw-threaded clutch member will perform an idle rotation and the drive connection between the pedal shaft and the rear wheel shaft will remain interrupted.

According to a preferred further feature of the invention, a particularly simple structure is provided in that the stop acts on the spring which is axially immovably connected to the screw-threaded clutch member and restrains the screw-threaded clutch member against rotation and is axially immovably connected thereto. That spring must be axially guided and held against rotation so that its guideway will be easily accessible.

To ensure a reliable engagement of the starting clutch with a predetermined coupling force, a further preferred feature of the invention resides in that the starting clutch consists of a ratchet clutch having end face claws and is operable by an energy storage spring mechanism operating like a toggle switch. Because the energy storage spring mechanism exerts a predetermined clutch-engaging force, the proper bias on the ratchet clutch and its satisfactory function will be ensured. The use of a mechanism which operating like a toggle switch permits a smooth shifting regardless of the force which is exerted to actuate the starting clutch.

The initiation of the starting of the motor of the motor-assisted bicycle will be facilitated if a common hand lever is provided for operating the engagement-preventing means associated with the overrunning clutch and for subsequently engaging the starting clutch. This arrangement precludes in a simple manner a false operation.

An embodiment of the invention is shown on the accompanying drawings, in which

Figure 2:
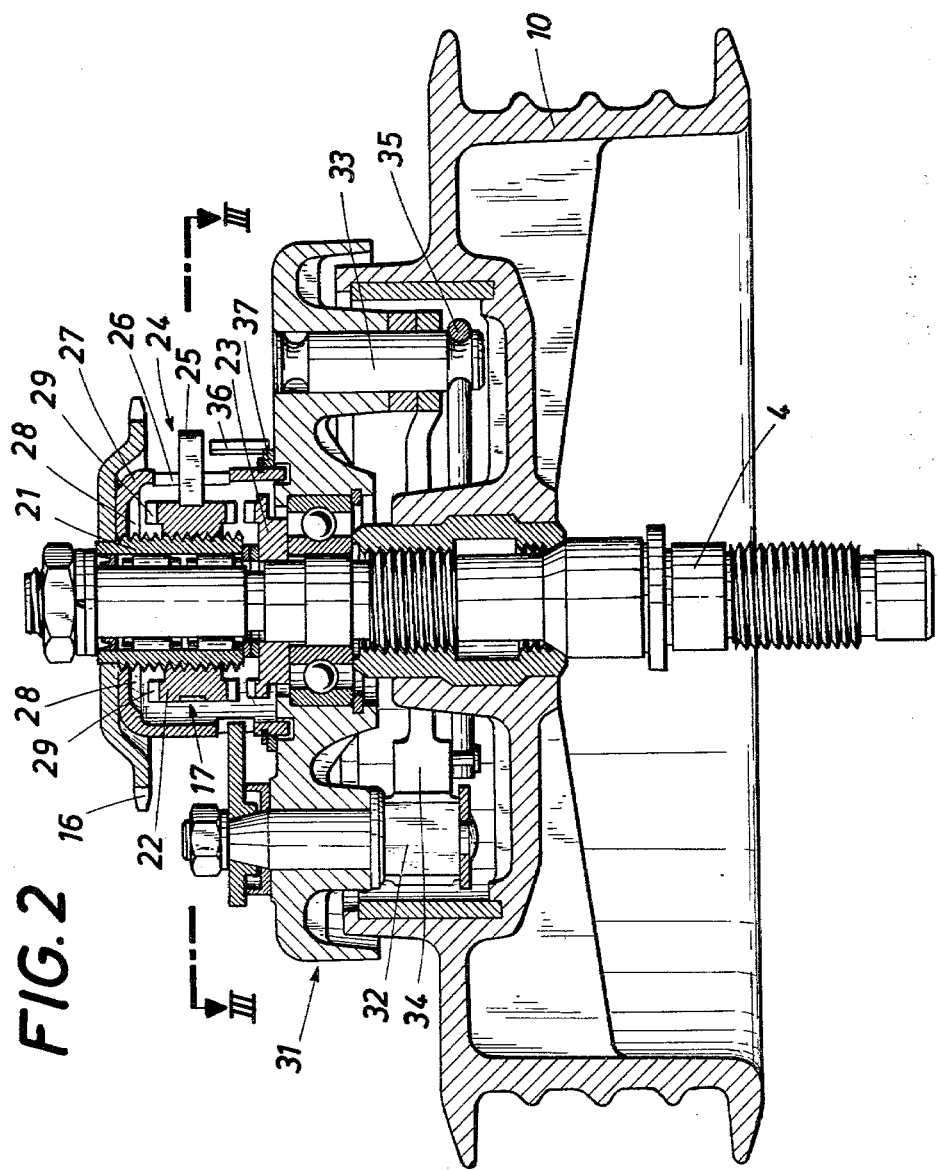

FIG. 1 is a diagrammatic sectional view showing the motor and the rear wheel swinging arm, FIG. 2 is an axial sectional view showing the overrunning clutch associated with the rear wheel, FIG. 3 is a sectional view taken on line III—III in FIG. 2, FIG. 4 is a top plan view, partly in section, showing the starting clutch with the associated energy storage spring mechanism, and FIG. 5 is a side elevation, also partly in section, showing the starting clutch and the energy storage spring mechanism.

As is apparent from FIG. 1, the crankshaft 1 of the motor 2 of the illustrative embodiment is connected to the rear wheel shaft 4 by a cone drive 3. If the tapered pulleys 5 of the drive 3 are urged toward each other in the conventional manner by centrifugal weights, the V-belt 6 will be shifted radially outwardly and because it has a certain length will force apart the tapered pulleys 7 associated with the rear wheel shaft 4. As a result, the effective diameter of the tapered pulleys 5 will be increased and that of the tapered discs 7 will be decreased.

The cone drive 3 is connected to the rear wheel shaft 4 by a pinion 8, which is driven by the tapered pulleys 7 and meshes with an internal gear 9 carried by the rear wheel shaft 4. The rim of the rear wheel is designated 10.

The rear wheel shaft 4 of the motor-assisted bicycle is rotatably mounted in a swinging arm 11, in which a pedal shaft 12 is rotatably mounted, which is parallel to the motor shaft 1 and comprises pedals, which are not shown for the sake of clarity. Two chain sprockets 13 and 14 are fixed to the pedal shaft 12. The chain sprocket 13 is operatively connected by a chain 15 to a chain sprocket 16 and the latter is operatively connected to the rear wheel shaft 4 by an overrunning clutch 17. The other chain sprocket 14 is operatively connected by a chain 18 and a chain sprocket 19 to a one-way starting clutch 20, which can be engaged to permit the crankshaft 1 of the motor 2 to be driven by the pedal shaft 12 when it is desired to start the motor.

In accordance with FIGS. 2 and 3, the chain sprocket 16 of the chain drive between the pedal shaft 12 and the rear wheel shaft 4 is connected to a screw-threaded sleeve 21, which is rotatably mounted on the rear wheel shaft 4 and constitutes the hub of the chain sprocket 16. A clutch member 22 of the overrunning clutch 17 has an internal screw thread for adjustably mounting clutch member 22 on the screw-threaded sleeve 21. The other clutch member 23 of the overrunning clutch 17 consists of a claw nut and is non-rotatably connected to the rear wheel shaft 4. The adjustable clutch member 22 is surrounded and resiliently engaged by a leaf spring 24, which has a hairpin-shaped extension 25. The latter is guided in an axial slot 26 of a pot-shaped coupling member 27. Coupling claws 28 are carried by the end wall of the coupling member 27 and cooperate with mating coupling claws 29 of the clutch member 22. The coupling member 27 is operable to actuate a lever 30 for applying the back-pedalling brake 31. In response to a suitable rotation of the coupling member 27, the brake cam 32 is rotated by the lever 30 to force apart against the force of the restoring spring 35 the brake shoes 34, which are pivoted on an oppositely disposed pin 33.

Because the actuating lever 30 normally holds the coupling member 27 against rotation, the spring 24 holds the clutch member 22 against rotation which causes the pedal shaft to move clutch member 22 axially when the pedal shaft drives rotatable threaded sleeve 21. In dependence on the sense of rotation, the clutch member 22 will either be axially displaced until it engages the clutch member 23 to establish a drive connection between the pedal shaft 12 and the rear wheel shaft 4, or will be forced against the end wall of the coupling member 27. In the latter position of the clutch member 22, the back-pedaling brake 31 will be applied because the coupling claws 28 and 29 interengage.

In order to prevent the rear wheel 10 to be driven when the motor 2 is started by means of the pedal shaft 12, the overrunning clutch 17 must not be engaged at that time, which means that the clutch member 22 must not engage the clutch member 23 even though the rotation of the pedal shaft causes the clutch member 22 to be shifted in a clutch-engaging direction. For this reason a stop 36 is provided, which is carried by a ring 37, which is rotatably mounted on the coupling member 27 and can be rotated to pivotally move the stop 36 into the path of the extension 25 of the spring 24 so that the spring 24 will engage the stop 36 before the clutch member 22 engages the clutch member 23. Being accommodated in a peripheral groove of the clutch member 22, the spring 24 is connected to the clutch member 22 to move axially in unison therewith. As a result, the engagement of the spring 24 with the stop 36 will cause the clutch member 22 to be axially restrained so that it will rotate in unison with the screw-threaded sleeve 21. This rotation will be restrained by the spring 24. Bowden cable 38 is connected to ring 37 and enables the ring to be actuated to impart to the stop 36 a pivotal movement to its operating position, in which the overrunning clutch 17 cannot be engaged. When the stop 36 has been moved out of the path of the extension 25 of the spring 24, the overrunning clutch 17 will operate in the conventional manner.

The one-way starting clutch 20 consists of a ratchet clutch which has end face claws. This is apparent from FIGS. 4 and 5. An energy storage spring mechanism 39 is provided for engaging the starting clutch 20 and comprises control lever 41, which is biased by a return tension spring 40 and which is pivoted on pivot pin 42 and non-rotatably connected to a pivoted arm 43. A tension spring 44 is connected at one end to the pivoted arm 43 and at its other end to a clutch-engaging lever 45, which is rotatably mounted on the pivot pin 42. The clutch-engaging lever 45 is connected to an axially movable clutch member of the starting clutch 20 so that the pivotal movement of the clutch-engaging lever 45 in opposite senses will cause the starting clutch 20 to be engaged and disengaged, respectively. The arrangement of the clutch-engaging lever 45 and of the pivoted arm 43 is such that the spring 44 connecting them will be in an overcenter position relative to the pivot pin 42 in both end positions of the lever 45. It is, therefore, apparent that the energy storage spring mechanism operate like a toggle switch. When a pivotal movement is imparted to the control lever 41 by means of a Bowden cable 46 against the force of the return spring 40, the arm 43 will be rotated in the counterclockwise sense, as viewed in FIG. 5, until the line of action of the force exerted by the spring 44 extends through the axis of the pivot pin 42. The force of the spring 44 will then produce an opposing torque so that the clutch-engaging lever 45 will be pivotally moved in the clutch-engaging sense whether or not the pivotal movement of the pivoted arm 43 is continued. As a result, the clutch-engaging lever 45 will tilt from one end position to the other in dependence on the position of the pivoted arm 43. For this reason the engagement of the starting clutch 20 is independent from the way in which the control lever is pivotally moved. The starting clutch will always be biased with the same engaging force and the energy storage spring mechanism when actuated will always cause the same predetermined clutch-engaging movement to be performed.

To permit a starting of the motor 2 without a rotation of the rear wheel, it is necessary to prevent an engagement of the overrunning clutch 17 before the starting clutch 20 is engaged. Both operations can be desirably accomplished by a common hand lever 47, which first actuates the Bowden cable 38 for operating the engagement-preventing means 36, 37 associated with the overrunning clutch 17 and then, after an appropriate lost motion provided by elongated slot 48 in control lever 41 in which attachment pin 49 of Bowden cable 46 slides, imparts a pivotal movement to the control lever 41 for actuating the energy storage spring mechanism 39.

Although the provision of separate chain drives for driving the chain sprockets 16 and 19 affords advantages, as will be understood, the pedal shaft 12 can obviously be connected to the chain sprockets 16 and 19 by a single chain drive. A gear train rather than a chain drive might be used to connect the pedal shaft 12 to the starting clutch 20.

What is claimed is:

1. A motor-assisted bicycle, comprising
   a supporting structure,
   a pedal shaft rotatably mounted in said supporting structure,
   a rear wheel shaft spaced apart from said pedal shaft and rotatably mounted in said supporting structure,
   a chain drive operatively connected to said pedal shaft,
   an overrunning clutch which is engageable to transmit torque from said chain drive to said rear wheel shaft,
   a motor carried by said supporting structure and having a motor shaft,
   a self-adjusting cone drive operatively connected to said motor shaft and to said rear wheel shaft,
   an arbitrarily engageable one-way starting clutch which on one side is operatively connected to said pedal shaft independently of said rear wheel shaft and on the other side is operatively connected to said motor shaft, and
   engagement-preventing means which are associated with said overrunning clutch and arbitrarily controllable to selectively permit and prevent its engagement.

2. A motor-assisted bicycle as set forth in claim 1, wherein said one side of said starting clutch is operatively connected to said pedal shaft by said chain drive.

3. A motor-assisted bicycle as set forth in claim 1, in which said overrunning clutch comprises a first clutch member non-rotatably connected to said rear wheel shaft, a screw-threaded sleeve rotatably mounted on said rear wheel shaft and operatively connected to said chain drive, a screw-threaded second clutch member screwed on said sleeve and carrying coupling claws on the side thereof opposite to said first clutch member, and a spring frictionally engaging said second clutch member to restrain it against rotation; and further comprising a back-pedalling brake carried by said rear wheel shaft and adapted to be applied so as to brake said rear wheel, said second clutch member being adjustable on said sleeve in a first axial direction into engagement with said first clutch member and in a second axial direction to a position in which said coupling claws engage said back-pedalling brake to apply the same, and said engagement-preventing means comprises a stop movable into and out of the path of said second clutch member to prevent and permit, respectively, its movement into engagement with said first clutch member.

4. A motor-assisted bicycle as set forth in claim 3, wherein said spring is mounted for axial movement in unison with said second clutch member.

5. A motor-assisted bicycle as set forth in claim 1, wherein said starting clutch comprises a ratchet clutch having end face claws, and further comprising an energy storage spring mechanism operable to engage said starting clutch.

6. A motor-assisted bicycle as set forth in claim 1, further comprising a hand lever and means for transmitting a undirectional operating movement of the hand lever in a first step to said engagement-preventing means to prevent an engagement of said overrunning clutch and subsequently, in a second step, to engage said starting clutch while holding said engagement-preventing means to prevent the engagement of the overrunning clutch.

* * * * *